(12) United States Patent
Westmacott et al.

(10) Patent No.: US 11,516,436 B2
(45) Date of Patent: Nov. 29, 2022

(54) METHOD AND SYSTEM FOR OBJECT LOCATION NOTIFICATION IN A FIRE ALARM SYSTEM

(71) Applicant: JOHNSON CONTROLS TYCO IP HOLDINGS LLP, Milwaukee, WI (US)

(72) Inventors: Ian C. Westmacott, Tewksbury, MA (US); Joseph Piccolo, III, Fitzwilliam, NH (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 18 days.

(21) Appl. No.: 15/333,984

(22) Filed: Oct. 25, 2016

(65) Prior Publication Data

US 2018/0114430 A1 Apr. 26, 2018

(51) Int. Cl.
| | | |
|---|---|---|
| *H04N 7/18* | (2006.01) |
| *G08B 29/18* | (2006.01) |
| *G08B 25/14* | (2006.01) |
| *G08B 17/00* | (2006.01) |

(52) U.S. Cl.
CPC ............. *H04N 7/181* (2013.01); *G08B 25/14* (2013.01); *G08B 29/183* (2013.01); *G08B 17/00* (2013.01)

(58) Field of Classification Search
CPC ....... G08B 27/001; G08B 17/00; H04N 7/181
See application file for complete search history.

(56) References Cited

U.S. PATENT DOCUMENTS

| | | | | |
|---|---|---|---|---|
| 2004/0103431 A1* | 5/2004 | Davenport | ............. | G08B 7/066 725/33 |
| 2008/0001735 A1* | 1/2008 | Tran | ................... | G06F 19/3418 340/539.22 |
| 2008/0129484 A1* | 6/2008 | Dahl | ...................... | G08B 25/14 340/501 |
| 2013/0008787 A1* | 1/2013 | Mammoto | ............. | G08B 17/10 204/407 |
| 2016/0105644 A1* | 4/2016 | Smith | ................ | H04N 5/23206 348/159 |

* cited by examiner

*Primary Examiner* — Neil R Mikeska
(74) *Attorney, Agent, or Firm* — Arentfox Schiff LLP

(57) ABSTRACT

A system and method for object location notification in a fire alarm system is disclosed. The fire alarm system includes a fire alarm panel and fire alarm devices deployed within a premises that capture audio and/or image information. The fire alarm panel generates alarm signals and provides notifications of the existence of objects of interest from the audio and/or image information captured by the fire alarm devices. In examples, the fire alarm devices include alarm notification devices that generate an audible and/or visible fire alarm to occupants of the premises such as sirens and strobe lights, and fire sensor devices such as flame sensor devices and smoke sensor devices that monitor for flame and smoke as the indications of fire, respectively. In one embodiment, an analytics system is integrated within the fire alarm devices that determines the existence of the objects of interest from the captured audio and/or image information.

28 Claims, 13 Drawing Sheets

METHOD AND SYSTEM FOR OBJECT LOCATION NOTIFICATION IN A FIRE ALARM SYSTEM

BACKGROUND OF THE INVENTION

Fire alarm systems are often installed within a premises such as commercial, residential, or governmental buildings. Examples of these buildings include offices, hospitals, warehouses, schools or universities, shopping malls, government offices, and casinos. The fire alarm systems typically include fire alarm devices deployed within the buildings that are directly wired to a fire alarm panel, although wireless systems are becoming more common. The fire alarm devices include alarm notification devices such as sirens and strobe lights that alert occupants of the building of potential fire conditions, and fire sensor devices that detect indications of fire such as heat, smoke, flame, and carbon monoxide, in examples.

In a traditional fire alarm system, the fire sensor devices send signals to the fire alarm panel upon detecting the indications of fire. The fire alarm panel then sends alarm signals to the alarm notification devices to alert occupants of the building, and contacts a central station via legacy telephone systems to alert emergency responders such as fire and police, in examples. A display screen of the fire alarm panel typically provides an indication of which fire sensor device(s) triggered the generation of the alarm signals.

These traditional fire alarm systems typically utilize low-bandwidth/high latency serial communications links to provide high reliability for communications between the fire alarm devices and the fire alarm panel. The fire alarm devices are also usually addressable. Communication between the fire alarm panel and the devices is most often executed in a master-slave fashion, where the fire alarm panel generally polls the fire alarm devices.

SUMMARY OF THE INVENTION

In the event of fire or other emergency, emergency responders have historically utilized systems separate from the fire alarm systems to obtain information concerning the existence of objects of interest within premises for first responders. In examples, objects of interest include persons or pets. In one example, an access control system within the building might provide the identities of individuals known to have accessed a secure entryway of the premises proximate to the time when the fire alarm panel of the fire alarm system generated an alarm signal. In another example, a video surveillance system can provide image information captured of the premises. This information can then be provided to first responders to enhance their analysis of the premises during emergency situations.

Current approaches for determining the existence of objects of interest when indications of fire are detected by fire alarm systems have significant limitations, however. In one example, the systems external to the fire alarms systems that determine the existence of objects of interest are not as reliable as the fire alarm systems, especially during an actual fire or other emergency. Additionally, the external systems might have control components or interfaces that are more difficult for first responders to find and access within a building than the control components (e.g. the fire alarm panel) of the fire alarm systems. As a result, any information concerning the existence of objects of interest provided by these other systems is often either inaccessible or unavailable to first responders.

Fire alarm systems, on the other hand, are designed to be high reliability systems. During a loss of primary power, fire alarm systems will failover to a dedicated secondary power source. The systems that determine the existence of objects of interest such as access control systems and video surveillance systems, in contrast, might not have secondary power sources. Because buildings often lose primary power during fire conditions, the other systems usually fail and cannot provide the information concerning the existence of objects of interest as a result. In addition, the other systems are also typically more sophisticated and require a higher level of interdependency between components in order to function, which also impacts reliability of the other systems. For example, while each of the fire alarm devices are typically hard-wired to the fire alarm panel to enable direct communications with the fire alarm panel, components within the other systems such as video cameras are increasingly being deployed in a wireless fashion, requiring wireless protocol routers and/or switches for enabling communications between the video cameras and the control element(s) of the other systems.

The systems external to the fire alarm systems also have control components or interfaces that are more difficult for first responders to find and access within a building than the control components (e.g. the fire alarm panel) of the fire alarm systems. While the locations of the control components for the other systems can vary from building to building and are not readily known or available to first responders, the locations of the master and secondary fire alarm panels within buildings are readily identifiable by first responders and are prescribed by federal, state, and local codes.

In one example of the inventive fire alarm system, the fire alarm devices deployed within a premises are enhanced to capture audio and/or image information within the premises. This provides advantages over external systems to accomplish the same objective because the fire alarm devices are already installed/deployed within the premises and are highly reliable. Then, because the high-latency communications links of typical fire alarm systems favor local processing of sensor data on the fire alarm devices themselves, the fire alarm devices are additionally enhanced to locally determine the existence of the objects of interest from the captured audio and/or image information. The fire alarm devices include an analytics system for this purpose. The fire alarm devices then send indications concerning the existence of the objects of interest determined via associated signals to the fire alarm panel.

In another example, the fire alarm devices are enhanced to capture audio and/or image information within the premises. In contrast, however, the fire alarm panel determines the existence of the objects of interest from the audio and/or image information captured by the fire alarm devices and transmitted to the fire alarm panel. The fire alarm panel can include an analytics system for this purpose, or can forward the audio and/or image information for processing by an external analytics system located on a remote network, in examples.

In the examples, the fire alarm devices are enhanced to include an auxiliary detector system that additionally provides the ability to capture audio and/or image information of the premises. Individual audio and/or video sensors can be included within the auxiliary sensor system for this purpose, or a combined audio/video sensor within the auxiliary detector system can be utilized. An analytics system located within the fire alarm devices, the fire alarm panel, and/or within a remote network can then determine the existence of the objects of interest from the audio and/or image information captured by the fire alarm devices.

In general, according to one aspect, the invention features a fire alarm system that includes fire alarm devices deployed within a premises that capture audio and/or image information, and a fire alarm panel. The fire alarm panel generates alarm signals and provides notifications of the existence of objects of interest from the audio and/or image information captured by the fire alarm devices.

The fire alarm devices include alarm notification devices that generate an audible and/or visible fire alarm to occupants of the premises and/or fire sensor devices that monitor for indications of fire. In one example, the fire alarm devices include smoke sensor devices that monitor for smoke as an indication of fire. In another example, the fire alarm devices include heat sensor devices that monitor for heat as an indication of fire. In yet another example, the fire alarm devices include carbon monoxide sensor devices that monitor for carbon monoxide as an indication of fire.

In a first embodiment of the fire alarm system, the fire alarm devices each include an analytics system that determines the existence of the objects of interest from the captured audio and/or image information. In a second embodiment of the fire alarm system, the fire alarm panel includes the analytics system that determines the existence of the objects of interest from the audio and/or image information captured by the fire alarm devices and transmitted to the fire alarm panel.

The fire alarm panel can generate a floorplan graphic of the premises that includes location information of the fire alarm devices and the objects of interest. Preferably, the fire alarm panel might also include a touch screen display that provides a floorplan graphic of the premises that includes location information of the fire alarm devices and/or the objects of interest. The fire alarm system additionally determines locations of the objects of interest relative to the areas in the premises within which the fire alarm devices are deployed, from the audio and/or image information captured by the fire alarm devices.

In general, according to another aspect, the invention features an alarm notification device. The alarm notification device includes a housing, one or more notification systems that generate an audible and/or visible fire alarm for occupants of the premises, one or more auxiliary detection systems, and a communications interface. The one or more auxiliary detection systems are located on or within the housing for capturing audio and/or image information. The communications interface is located on or within the housing for communicating with a fire alarm panel that provides notifications of existence of objects of interest from the audio and/or image information captured by the one or more auxiliary detection systems.

In general, according to yet another aspect, the invention features a fire sensor device. The fire sensor device includes a housing, one or more fire detection systems located on or within the housing for detecting indications of fire, one or more auxiliary detection systems, and a communications interface. The one or more auxiliary detection systems are similarly located on or within the housing for capturing audio and/or image information. The communications interface is located on or within the housing for communicating with a fire alarm panel that provides notifications of existence of objects of interest from the audio and/or image information captured by the one or more auxiliary detection systems.

In general, according to yet another aspect, the invention features a fire alarm panel. The fire alarm panel includes a touch screen display, a network interface that enables communications with fire alarm devices that capture audio and/or image information, a panel controller, and an analytics system. The panel controller receives the audio and/or image information from the fire alarm devices via the network interface, and the analytics system determines the existence of objects of interest from the audio and/or image information received by the panel controller.

In general, according to still another aspect, the invention features a method for a fire alarm system including fire alarm devices deployed within a premises capturing audio and/or image information. The method also includes determining the existence of objects of interest from the audio and/or image information captured by the fire alarm devices, and providing notifications of the existence of the objects of interest.

The method can further comprise alarm notification devices of the fire alarm devices capturing the audio and/or image information, where the alarm notification devices generate an audible and/or visible fire alarm to occupants of the premises.

The method can further comprise fire sensors of the fire alarm devices monitoring for indications of fire. In one example, the fire alarm devices include smoke sensors that monitor for smoke as an indication of fire.

In one implementation, in response to one or more of the fire alarm devices detecting an indication of fire, the one or more of the fire alarm devices send the indication of fire to a fire alarm panel of the fire alarm system. The fire alarm panel then sends messages to the fire alarm devices requesting the capturing of the audio and/or image information.

Preferably, determining the existence of objects of interest from the audio and/or image information captured by the fire alarm devices comprises an analytics system applying audio and/or image detection algorithms to the audio and/or image information. In the first embodiment, the analytics system is located within the fire alarm devices. In the second embodiment, the analytics system is located within a fire alarm panel of the fire alarm system; or alternatively located within a network that is remote to the fire alarm system or any combination of these configurations.

In one implementation, providing notifications of the existence of the objects of interest comprises the fire alarm devices sending a list of the objects of interest to a user device. A fire alarm panel of the fire alarm system can also present location information of the fire alarm devices and the objects of interest on a touch screen display of the fire alarm panel.

Providing notifications of the existence of the objects of interest might comprise generating a floorplan graphic of the premises that includes location information of the fire alarm devices and the objects of interest, and sending the floorplan graphic for presentation within a display screen of a user device.

Providing notifications of the existence of the objects of interest could comprise a fire alarm panel of the fire alarm system generating a floorplan graphic of the premises that includes location information of the fire alarm devices and the objects of interest, and presenting the floorplan graphic on a touch screen display of the fire alarm panel.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

As used herein, the singular forms and the "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Figure 1:
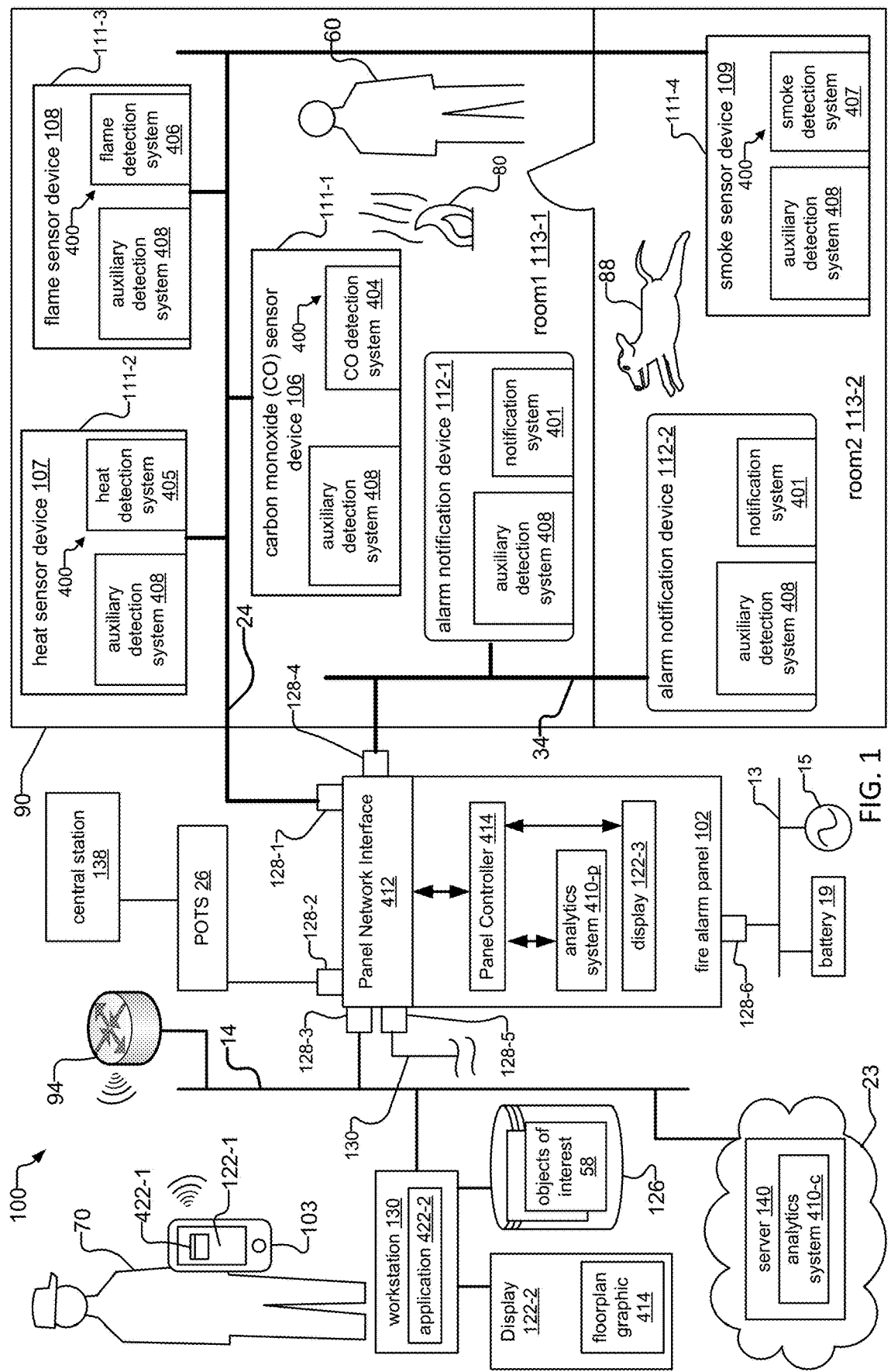
FIG. 1 is a schematic diagram of an exemplary fire alarm system to which the present invention is applicable, showing various fire alarm devices deployed within a premises that communicate with a fire alarm panel.

FIG. 1 shows an exemplary fire alarm system 100 to which the present invention is applicable. The system 100 includes a tire alarm panel 102 that communicates with fire alarm devices. The fire alarm devices are deployed in a premises such as a building 90 in a distributed fashion, such as within different rooms 113 of the building 90. The fire alarm devices are generally one of two types: fire sensor devices 111 and notification appliances, also known as alarm notification devices 112.

The fire sensor devices 111 include an auxiliary detection system 408 and a fire detection system 400. The alarm notification devices 112 include an auxiliary detection system 408 and a notification system 401.

Examples of fire sensor devices 111 include carbon monoxide sensor devices 106, heat sensor devices 107, flame sensor devices 108, and smoke sensor devices 109. Because these devices are specific instances of fire sensor devices 111, each is also labeled with references 111-1, 111-2, 111-3, and 111-4, respectively. Carbon monoxide sensor device 106 includes a CO detection system 404 as the fire detection system 400. Heat sensor device 107 includes a heat detection system 405 as the fire detection system 400. Flame sensor device 108 includes a flame detection system 406 as the fire detection system 400. Finally, smoke sensor device 109 includes a smoke detection system 407 as the fire detection system 400. It can also be appreciated that one or more of these detection systems can be combined within the same fire detection system 400.

The fire sensor devices 111-1 through 111-4 monitor for indications of fire. For this purpose, the fire detection systems 400 of the fire sensor devices 111 include one or more different types of sensors. In examples, carbon monoxide (CO) sensor device 106/111-1 includes a CO sensor that monitors for CO as an indication of fire; heat sensor device 107/111-2 typically includes a thermistor that monitors for heat; flame sensor device 108/111-3 includes an optical sensor, an ultraviolet sensor, and/or an infrared (IR) sensor that monitor for flames; and smoke sensor device 109/111-4 includes a photoelectric sensor that monitors for smoke. Alternatively, it can also be appreciated that the fire detection systems 400 of the fire sensor devices 111 can include multiple sensors of different types to improve their ability to detect indications of fire.

The fire alarm panel 102 includes a panel network interface 412, a panel controller 414, a display 122-3 such as a touch screen display, and an optional analytics system 410-p. The panel controller 414 controls the panel network interface 412, the analytics system 410-p, and the display 122-3. The display 122-3 displays information concerning the fire alarm system 100. In examples, this information includes the operational state and/or status of the fire alarm devices and the fire alarm panel 102 and the locations of the fire alarm devices within the premises. In one implementation, the display 122-3 presents a user interface that enables interactive selection, configuration, and display of the components of the fire alarm system 100. In one example, the user interface is a graphical user interface (GUI).

In one implementation, the fire sensor devices and the alarm notification devices 112 are hardwired to their respective circuits 24/34 in a loop or hub and spoke configuration. Loop configurations are common and easy to install. Hub and spoke configurations or star topologies are not susceptible to signal interference or tampering that can disable or interrupt functioning of wireless fire alarm systems. The hub and spoke configuration also allows a homeowner or service technician/operator 70 to test and control each device independently from the fire alarm panel 102 for maximum flexibility and ease of troubleshooting. In one implementation, the fire alarm devices communicate over their respective loops or links 24/34 with the fire alarm control panel 102 via standard serial protocols such as RS-232, RS422/RS-485, Modbus, Wiegand, and/or proprietary messaging and signaling protocols, in examples. In another implementation, the fire alarm devices are internet protocol (IP) enabled devices.

The fire alarm panel 102 provides interface 128-6 for connecting to a power circuit 13. The power circuit 13 provides both primary power such as alternating current 15 from a power grid and secondary power via a battery 19 such as an uninterruptible power supply (UPS) that is dedicated to the fire alarm panel 102.

The panel network interface 412 provides interfaces 128-1 through 128-5 for communicating with different networks or subsystems of the fire alarm system 102. Interface 128-1 enables communications between the fire alarm panel 102 and fire alarm devices on a fire detection circuit 24. Interface 128-4 enables communications between the fire alarm panel 102 and alarm notification devices 112 on a notification circuit 34.

Interface 128-3 of the panel network interface 412 enables communications between the fire alarm panel 102 and a local area network 14 such as an Ethernet network. The local area network 14 includes devices that communicate via standard protocols such as IP and/or proprietary protocols. The local area network 14 includes a workstation 130, a wireless access point 94, and provides communications to a remote network 23 such as a cloud-based network. The wireless access point 94 provides a wireless network that enables communications between the local area network 14 and mobile user devices 103 carried by operators 70.

The user devices 103 communicate over the wireless network via wireless protocols such as WiFi and Bluetooth, in examples. Examples of user devices 103 include mobile phones and tablet/phablets. User devices 103 include a display screen 122-1 and an application 422-1 that executes on the user device 103 for accessing and and/or configuring the fire alarm panel 102 and the fire alarm devices. The application 422-1 displays information on the display screen 122-1 that enables the operator 70 to interact with the application 422-1 for management and configuration of the components of the fire alarm system 100.

The workstation 130 has a display 122-2. The workstation is connected to a database 126, and includes application 422-2 executing on the workstation that also enables operators 70 to manage and configure the components of the fire alarm system 100. In one example, the display 122-2 is a touchscreen that displays an interactive floorplan graphic 414 that is representative of the fire alarm devices and their locations relative to the rooms 113 within the premises 90. The fire alarm system 102 determines the existence of objects of interest 102 within the premises 90 and stores any determined objects of interest 58 to the database 126. In examples, objects of interest 58 include persons 60 and pets 88. The remote network 23 includes a server 140, which in turn includes an analytics system 410-c.

Interface 128-2 of the panel network interface 412 provides in one example a dedicated telephone line to a circuit switched telephone system such as a Plain Old Telephone Service (POTS) 26. The POTS 26 connects to a central station 138 for contacting first responders in the event of an emergency, such as when an indication of fire 80 detected within the premises 90 by the fire alarm devices. The fire alarm devices send signals that indicate the fire condition to the fire alarm panel 102, which in turn notifies the first responders at the central station 138.

Interface 128-5 of the panel network interface 412 enables communications between the fire alarm panel 102 and a building control system 130. In response to alarm conditions, the fire alarm panel 102 can send control signals and or switched power to the building control system 130. Applications include fan control, elevator recall, door holders, and activation of fire suppression systems, in examples.

Figure 2:
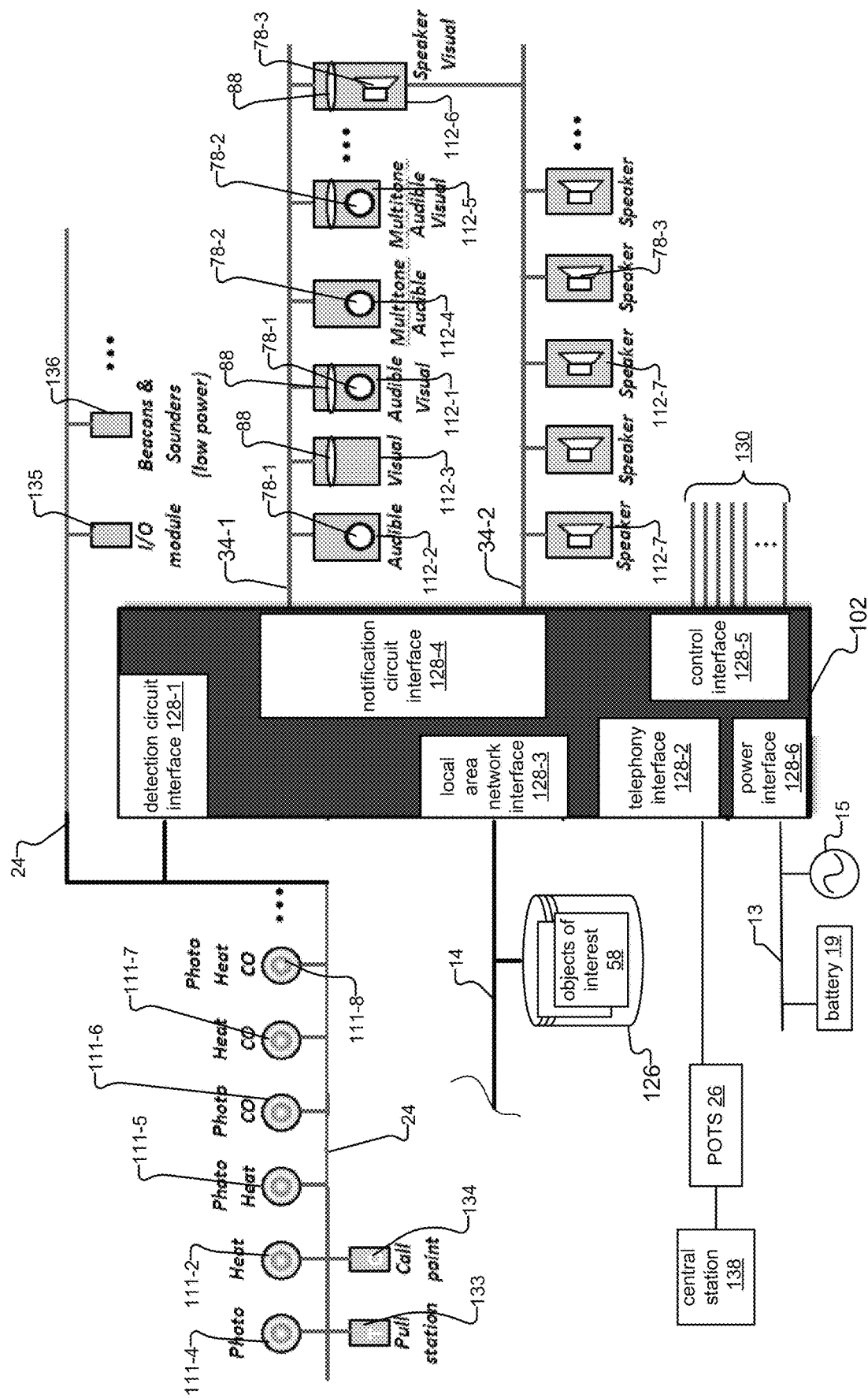
FIG. 2 is a schematic diagram of a fire alarm panel of the fire alarm system in FIG. 1, showing detail for interfaces of the fire alarm panel and the circuits and subsystems that connect to the interfaces.

FIG. 2 provides more detail for interfaces 128 of the fire alarm panel 102. Via its interfaces 128, the fire alarm panel 102 connects to different circuits and subsystems of the fire alarm system 100. The circuits include one or more fire detection circuits 24 that include fire sensor devices 111 of the fire alarm devices, one or more notification circuits 34 that include alarm notification devices 112 of the fire alarm devices and a power circuit 13. The subsystems include a telephone system such as POTS 26, a local area network 14 and a building control system 130. Different configurations of the fire alarm devices within the circuits 24/34 are also shown.

In more detail, interface 128-1, also known as the detection circuit interface, provides connections to fire sensor devices 111 of the fire alarm devices which communicate over the one or more detection circuits 24. Interface 128-2, also known as a telephony interface, provides a dedicated phone line connection to the Plain Old Telephone Service (POTS) 26. Interface 128-3, also known as a local area network interface, provides a connection to the local area network 14. Interface 128-4, also known as a notification circuit interface, provides connections to alarm notification devices 112 of the fire alarm devices that communicate over one or more notification circuits 34-1 and 34-2. Interface 128-5, also known as a control interface, provides connections to building control system 130. Finally, interface 128-6, also known as a power interface 126-6, provides connection to the power circuit 13.

The detection circuit or loop 24 includes various fire sensor devices 111 of the fire alarm devices that monitor for indications of fire within a building 90. The fire sensor devices 111 detect and send the indications of fire in messages and/or via signals to the fire alarm panel 102. Examples of fire sensor devices 111 on the detection circuit include fire sensor device 111-2/107 and 111-4/109 and various hybrid versions of the fire sensor devices 111 that include multiple sensor types. The hybrid versions of the fire sensor devices 111 improve the ability for the devices to detect indications of fire. For example, fire sensor device 111-5 includes both a photoelectric sensor and a heat sensor; fire sensor device 111-6 includes both a photoelectric sensor and a carbon monoxide sensor; fire sensor device 111-7 includes both a heat sensor and a carbon monoxide sensor; and fire sensor device 111-8 includes a photoelectric sensor, a heat sensor, and a carbon monoxide sensor.

The detection circuit 24 also includes devices that do not detect indications of fire but do assist in fire detection and response. In examples, a pull station 133 and a call point 134 can be utilized by occupants of the building 90 to manually signal the fire alarm panel 102 to generate an alarm signal. Low power beacons/sounders 136 can generate an audible fire alarm to occupants 60 of the premises. An I/O module 135 can reliably control other equipment such as door holders, fire dampers, smoke control systems, and fire suppression systems that are connected to output interfaces of the I/O module 135.

An input interface of I/O module 135 is connected to the detection circuit 24, and individual pieces of equipment are connected to separate output interfaces of the I/O module 135. When any of the fire sensor devices 111, the pull station 133, and/or the call point 134 send a signal over the detector circuit 24 indicating a fire condition, the I/O module 135 receives the signal and sends equipment-specific output control signals via its output interfaces in response.

The notification circuits 34-1 and 34-2 include alarm notification devices 112 that generate an audible and/or visible fire alarm to occupants 60 of the premises 90. The alarm notification devices 112 can include different combinations of audible indicators 78 and/or visual indicators 88 for this purpose. In one example, notification circuit 34-1 includes alarm notification devices 112-1 through 112-6. Alarm notification device 112-1 includes both a visual indicator 88 (a strobe light), and an audible indicator 78-1 (a buzzer). Alarm notification device 112-2 includes an audible indicator 78-1. Alarm notification device 112-3 includes a visual indicator 88. Alarm notification device 112-4 includes audible indicator 78-2 (a siren capable of generating multiple tones). Alarm notification device 112-5 includes both visual indicator 88 and audible indicator 78-2, Finally, alarm notification device 112-6 includes both visual indicator 88 and audible indicator 78-3 (a speaker).

Notification circuit 34-2 includes alarm notification device 112-6 and multiple alarm notification devices 112-7. Alarm notification devices 112-7 include audible indicator 78-3. Additionally, the alarm notification devices 112 can be wired/connected across multiple notification circuits 34. For example, alarm notification device 112-6 connects to both notification circuit 34-1 and 34-2.

Figure 3A:
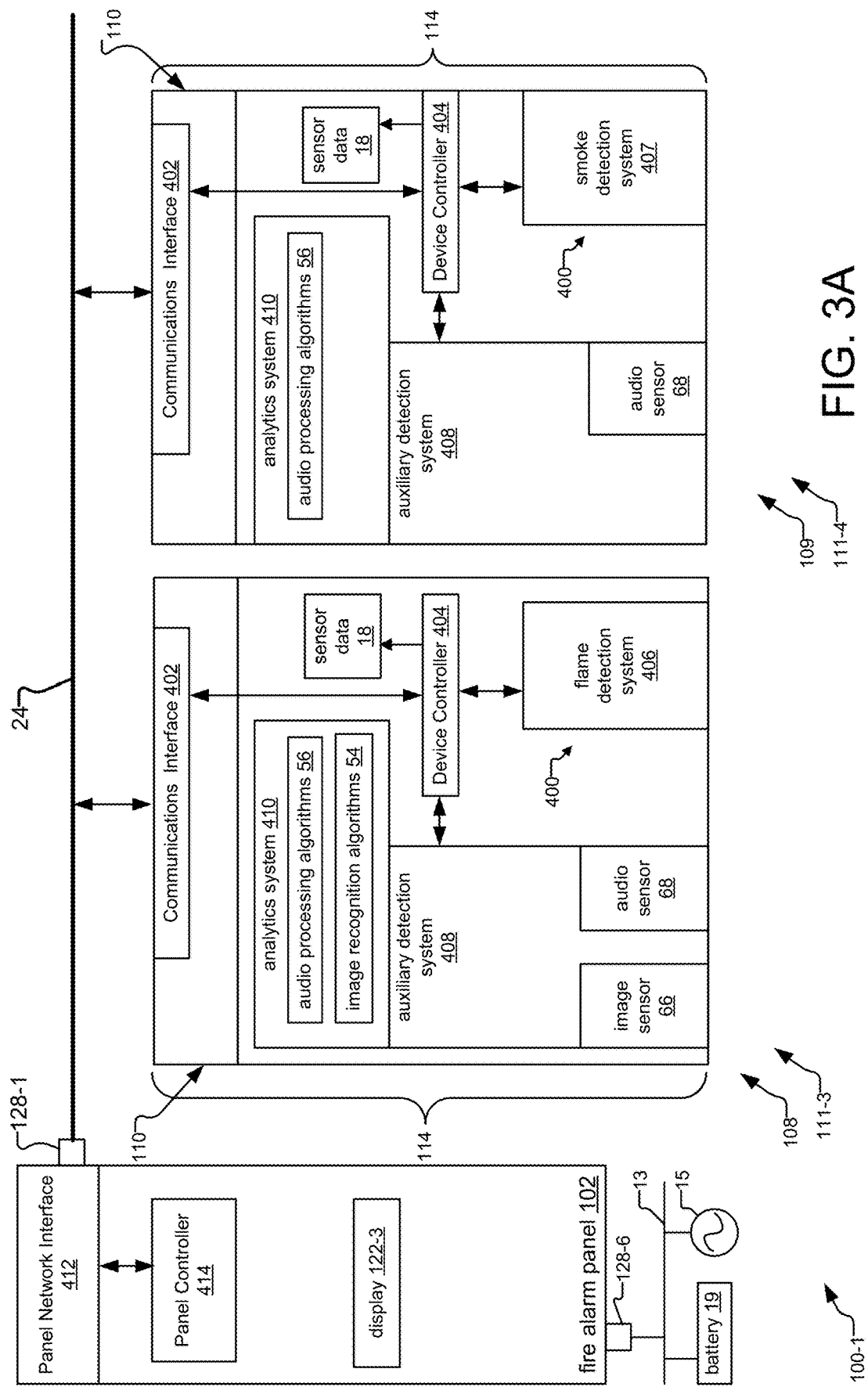
FIG. 3A is a block diagram showing detail for a first embodiment of the fire alarm system, showing fire sensor devices of the fire alarm devices that include an analytics system for determining the existence of objects of interest from audio and/or image information captured by the fire sensor devices.

FIG. 3A shows detail for a first embodiment of the fire alarm system 100-1. Here, exemplary fire sensor devices 111-3 (flame sensor device 108) and 111-4 (smoke sensor device 109) of the fire alarm devices are connected to detector circuit 24, which in turn connects to the detector circuit interface 128-1 of the fire alarm panel 102.

Common components among the fire sensor devices 111-3 and 111-4 include a housing 114 and a base 110 of the housing 110. The base 110 enables mounting of the fire sensor devices 111-3 and 111-4 to a surface, such as on a ceiling within rooms 113 of a building 90. The base 110 includes a communications interface 402 that enables communications between the fire sensor devices 111 and the detector circuit 24. The communications interface 402 is preferably located on or within the housing 114 for communicating with the fire alarm panel 102. A device controller 404 located within the housing 114 enables communications between the communications interface 402 and other components within the housing 114. The housing 114 also includes an analytics system 410, sensor data memory 18, and an auxiliary detection system 408.

Fire sensor device 111-3/108 additionally includes a flame detection system 406 as the fire detection system 400. The flame detection system 406, in turn, includes one or more sensors such as optical, ultraviolet, and/or infrared sensors that enable the flame detection system 406 to detect flame as an indication of fire. Auxiliary detection system 408 includes an audio sensor 68 and an image sensor 66 that capture audio and/or image information 28/38, respectively. Analytics system 410 includes audio processing algorithms 56 and image recognition algorithms 54.

The auxiliary detection system 408 can be implemented a number of different ways. In one example, the image sensor 66 is a CCD or CMOS spatially-resolved image detector. In one example, it has a spatial resolution of greater than 1000×1000 pixels and thus generates image information of similar resolution. On other examples, lower resolution detectors are used having less than 200×200 pixels. Such lower resolution devices are less expensive yet can still resolve movement. On the other hand, in still other examples, much high resolution devices are used that can further be used to provide facial recognition information. Typically, an imaging lens or lens system is used to form an image on the image detector. In the case of the audio sensor, here a microphone is used or similar sound transduction detection system. It further includes an analog to digital converter to convert the detected sound to digital audio information.

Fire sensor device 111-4/109 additionally includes a smoke detection system 407 as the fire detection system 400. The smoke detection system 407, in turn, includes one or more sensors such as a photoelectric sensor that enables the smoke detection system 407 to detect smoke as an indication of fire. Auxiliary detection system 408 here includes only an audio sensor 68 that captures audio information 28. Analytics system 410 includes audio processing algorithms 56. In other examples, however, it could include only an image sensor.

Figure 4:
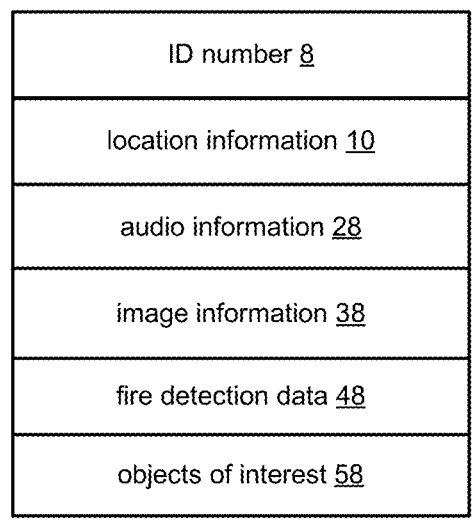
FIG. 4 is a block diagram of sensor data stored within the fire alarm devices, in accordance with the first embodiment of the fire alarm system in FIG. 3A and FIG. 3B.

Relevant interactions between components within fire sensor device 111-3/108 and 111-4/109 during a fire condition 80 are now described herein below. With reference to FIG. 4, the fire sensor devices 111 store and reference information within sensor data memory 18 of the fire sensor devices 111. In general, the memory 18 is typically random access memory such as volatile or nonvolatile memory.

FIG. 4 provides detail for sensor data 18 stored within the memory of the a fire alarm device in accordance with the first embodiment of the fire alarm system 100-1 described in FIG. 3A and FIG. 3B herein above. The sensor data stored in memory 18 includes an ID number 8, location information 10, audio information 28, image information 38, fire detection data 48, and objects of interest 58.

Now returning to FIG. 3A an example scenario is described below that illustrates operation of the fire sensor devices 111-3 and 111-4 during a fire condition 80 in the premises/building 90.

First, fire sensor device 111-3/108 detects an indication of fire in room 1 113-1 via its flame detection system 406. The flame detection system 406 saves the indication of fire to the fire detection data 48 field within the sensor data memory 18. The device controller 404 then provides the fire detection data 48 to the fire alarm panel 102 via the communications interface 402. In response to receiving an alarm signal generated by the fire alarm panel 102 over the communications interface 402, the device controller 404 instructs the auxiliary detection system 408 to capture audio and/or image information 28/38. In other examples, the auxiliary detection system 408 continuously captures the audio and/or video information 28/38 and stores the information in a ring buffer in memory 18, so that the auxiliary detection system always has stored audio and image information for a predetermined history of 10 minutes or more, for example, preceding the receipt of the alarm signal. The device controller 404 stores the audio and/or image information 28/38 to sensor data memory 18. Then, the device controller 404 provides the audio and/or image information 28/38 to the analytics system 410.

The analytics system 410 determines the existence of objects of interest 58 from the captured audio and/or image information 28/38. The analytics system 410 applies its audio processing algorithms 56 and image recognition algorithms 54 to the audio and/or image information 28/38 for this purpose, and saves any determined objects of interest 58 to the sensor data 18 memory.

The location information 10 not only includes information concerning the location of the fire alarm sensor 111-3/108 itself, but also can include locations of the objects of interest 58. For this purpose, in one example, the analytics system 410 can determine the locations of the objects of interest 58 relative to the areas 113 in the building 90 within which the fire alarm devices (e.g. fire sensor devices 111-3) are deployed, from the audio and/or image information 28/38 captured by the fire alarm devices.

Turning now to fire sensor device 111-4/109, in response to receiving the alarm signal generated by the fire alarm panel 102 over the communications interface 402, the device controller 404 instructs the auxiliary detection system 408 to capture audio information 28 or possibly image information 38. In other examples, the auxiliary detection system 408 continuously captures the audio and/or video information 28/38 and stores the information in a ring buffer in memory 18, so that the auxiliary detection system always has stored audio and image information for a predetermined history, for example, preceding the receipt of the alarm signal. The device controller 404 stores the audio information 28 to sensor data memory 18. Then, the device controller 404 provides the audio information 28 to the analytics system 410.

The analytics system 410 determines the existence of objects of interest from the captured audio information 28 or image information 38. The analytics system 410 applies its audio processing algorithms 56 to the audio information 28 for this purpose, and saves any determined objects of interest 58 to the sensor data memory 18.

The location information 10 not only includes information concerning the location of the fire alarm sensor 111-4/109 itself, but also can include locations of the objects of interest 58. For this purpose, in one example, the analytics system 410 can determine the locations of the objects of interest 58 relative to the areas 113 in the building 90 within which the fire alarm devices (e.g. fire sensor devices 111-4) are deployed, from the audio information 28 captured by the fire alarm devices.

Additionally, the device controllers 404 of the fire sensor devices 111-3/111-4 can send messages over the detection circuit 24 that include the determined objects of interest 58. Each message also includes an instruction for the fire alarm panel 102 to store the objects of interest 58 extracted from the message to database 126 on the local area network 14. This enables further processing upon the objects of interest 58 for each of the fire alarm devices (here, fire sensor devices 111) to be executed by components other than the fire alarm devices themselves. In yet another implementation, the device controllers 404 can send the entirety of the sensor data from memory 18 in messages to the fire alarm panel 102.

The fire alarm panel 102, in turn, provides notifications of existence of the objects of interest 58 from the audio and/or image information 28/28 captured by the auxiliary detection system 408 of each of the fire alarm devices (here, fire sensor devices 111). In one example, the fire alarm panel 102 provides notifications of existence of the objects of interest 58 by displaying a list of the objects of interest 58 received from each of the fire alarm devices on its touch screen display 122-3, and additionally by sending the list of the objects of interest 58 to application 422-2 of the workstation 130 and application 422-1 of the user device 103.

In another example, the fire alarm panel 102 provides notifications of existence of the objects of interest 58 by first building a floorplan graphic 414 that includes the objects of interest 58. Then, the fire alarm panel 102 presents the floorplan graphic for display on the touch screen display 122-3, and additionally sends the floorplan graphic 414 for display within applications 422-1/422-2. Application 422-1 is then displayed on display screen 122-1 of user device 103, while application 422-2- is then displayed on display screen 122-2 of workstation 130.

Figure 3B:
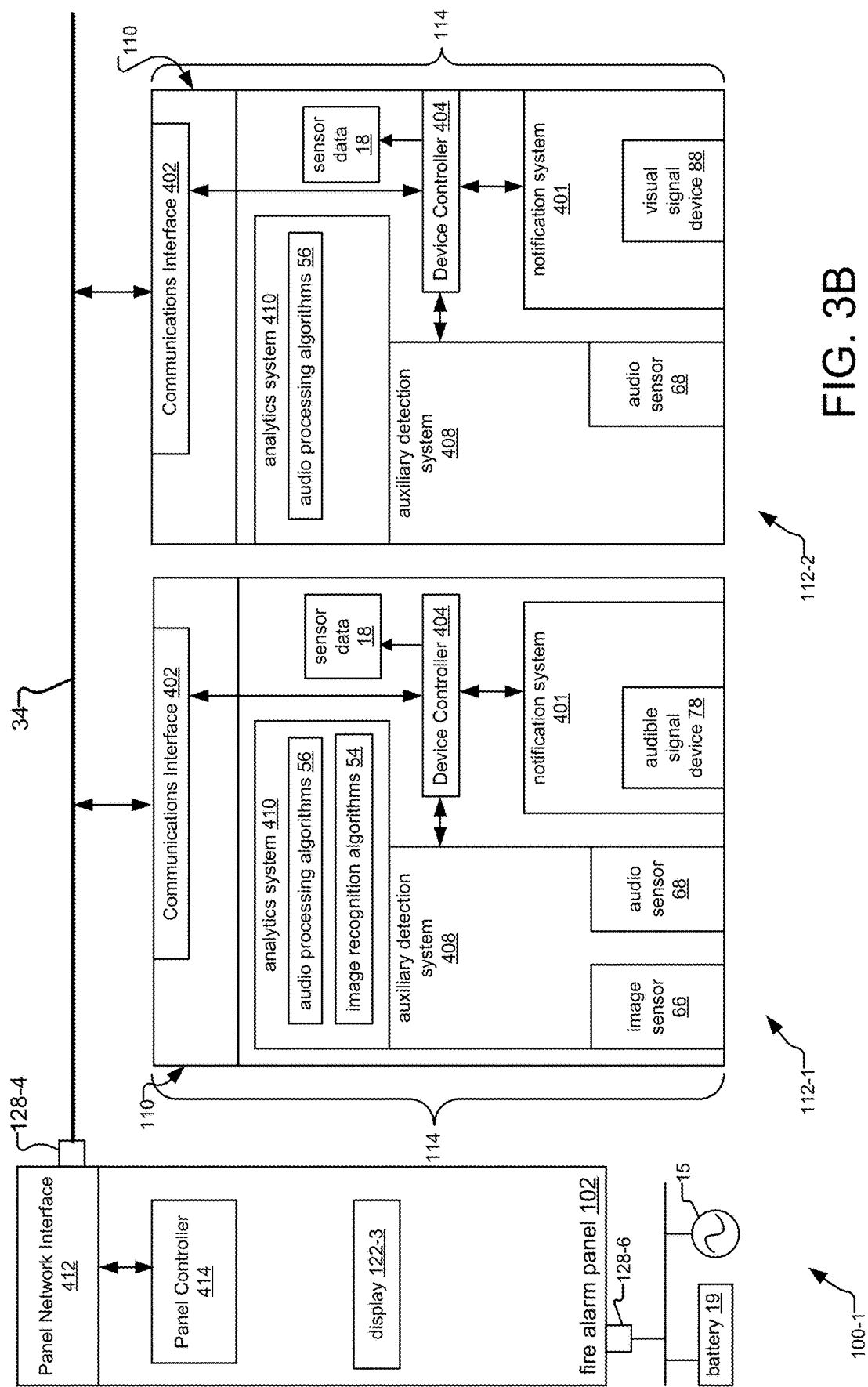
FIG. 3B is a block diagram also showing detail for the first embodiment of the fire alarm devices, showing alarm notification devices of the fire alarm devices.

FIG. 3B also shows detail for the first embodiment of the fire alarm system. Here, alarm notification devices 112-1 and 112-2 are connected to notification circuit 34, which in turn connects to the notification circuit interface 128-4 of the fire alarm panel 102.

Common components among the alarm notification devices 112-1 and 112-2 include a housing 114 and a base 110 of the housing 114. The base 110 enables mounting of the alarm notification devices 112 to a surface, such as on a ceiling or wall within rooms 113 of a building 90. The base 110 includes a communications interface 402 that enables communications between the alarm notification devices 112 and the notification circuit 34. A device controller 404 located within the housing 114 enables communications between the communications interface 402 and other components within the housing 114. The housing 114 also includes an analytics system 410, sensor data memory 18, an auxiliary detection system 408, and a notification system 401.

Alarm notification device 112-1 additionally includes an audible signal device 78 within its notification system 401. The audible signal device 78 generates an audible fire alarm to occupants 60 of the premises/building 90. The auxiliary detection system 408 includes an audio sensor 68 and an image sensor 66 that capture audio and image information 28/38, respectively. The analytics system 410 includes audio processing algorithms 56 and image recognition algorithms 54.

Alarm notification device 112-2 additionally includes a visual signal device 88 within its notification system 401. The visual signal device 88 generates a visual fire alarm to occupants 60 of the premises/building 90. The auxiliary detection system 408 includes an audio sensor 68 that captures audio information 28. Analytics system 410 includes audio processing algorithms 56.

Relevant interactions between components within alarm notification device 112-1 and 112-2 during a fire condition 80 are now described herein below. With reference to FIG. 4, the alarm notification devices 112 store and reference information within sensor data stored in memory 18 of the alarm notification devices 112.

When alarm notification device 112-1 receives an alarm signal generated by the fire alarm panel 102 over the notification circuit 24, in one implementation, the device controller 404 instructs the auxiliary detection system 408 to capture audio and/or image information 28/38. In other examples, the auxiliary detection system 408 continuously captures the audio and video information 28/38 and stores the information in a ring buffer in memory 18, so that the auxiliary detection system always has stored audio and image information for a predetermined history. The device controller 404 stores the audio and/or image information 28/38 to sensor data memory 18. Then, the device controller 404 provides the audio and/or image information 28/38 to the analytics system 410.

The analytics system 410 determines the existence of objects of interest from the captured audio and/or image information 28/38. The analytics system 410 applies its audio processing algorithms 56 and image recognition algorithms 54 to the audio and/or image information 28/38 for this purpose, and saves any determined objects of interest 58 to the sensor data of memory 18.

The location information 10 not only includes information concerning the location of the alarm notification device 112-1 itself, but also can include locations of the objects of interest 58. For this purpose, in one example, the analytics system 410 can determine the locations of the objects of interest 58 relative to the areas 113 in the building 90 within which the fire alarm devices (e.g. alarm notification devices 112) are deployed, from the audio and/or image information 28/38 captured by the fire alarm devices.

When alarm notification device 112-2 receives an alarm signal generated by the fire alarm panel 102 over the notification circuit 24, in one implementation, the device controller 404 instructs the auxiliary detection system 408 to capture audio and/or image information 28/38 depending on the type of senor included in the device. In other examples, the auxiliary detection system 408 continuously captures the audio and/or video information 28 and stores the information in a ring buffer in memory 18. The device controller 404 stores the audio and image information 28 to sensor data memory 18. Then, the device controller 404 provides the audio and image information 28 to the analytics system 410.

The analytics system 410 determines the existence of objects of interest 58 from the captured audio and image information 28. The analytics system 410 applies its audio processing algorithms 56 to the audio information 28 and image recognition algorithms to the image information 38 for this purpose, and saves any determined objects of interest 58 to the sensor data 18.

The location information 10 not only includes information concerning the location of the alarm notification device 112-2 itself, but also can include locations of the objects of interest 58. For this purpose, in one example, the analytics system 410 can determine the locations of the objects of interest 58 relative to the areas 113 in the building 90 within which the fire alarm devices (e.g. alarm notification devices 112) are deployed, from the audio and/or image information 28/38 captured by the fire alarm devices.

Additionally, the device controller 404 of the alarm notification devices 112 can send messages over the notification circuit 34 that include the determined objects of interest 58. Each message also includes an instruction for the fire alarm panel 102 to store the objects of interest 58 extracted from the message to database 126 on the local area network 14. This enables further processing upon the objects of interest 58 for each of the fire alarm devices (here, alarm notification devices 112) to be executed by components other than the fire alarm devices themselves.

The fire alarm panel 102, in turn, provides notifications of existence of the objects of interest 58 from the audio and/or image information 28/38 captured by the auxiliary detection system 408 of each of the fire alarm devices (here, alarm notification devices 112). In one example, the fire alarm panel 102 provides notifications of existence of the objects of interest 58 by displaying a list of the objects of interest 58 received from each of the fire alarm devices on the touchscreen display 122-3, and additionally by sending the list of the objects of interest 58 to application 422-2 executing on the workstation 130 and application 422-1 executing on the mobile user device 103. In another example, the fire alarm panel 102 provides notifications of existence of the objects of interest 58 by first building a floorplan graphic 414 that includes the objects of interest 58. Then, the fire alarm panel 102 presents the floorplan graphic for display on the touchscreen display 122-3, and additionally sends the floorplan graphic 414 for display within applications 422-1/422-2.

Figure 5A:
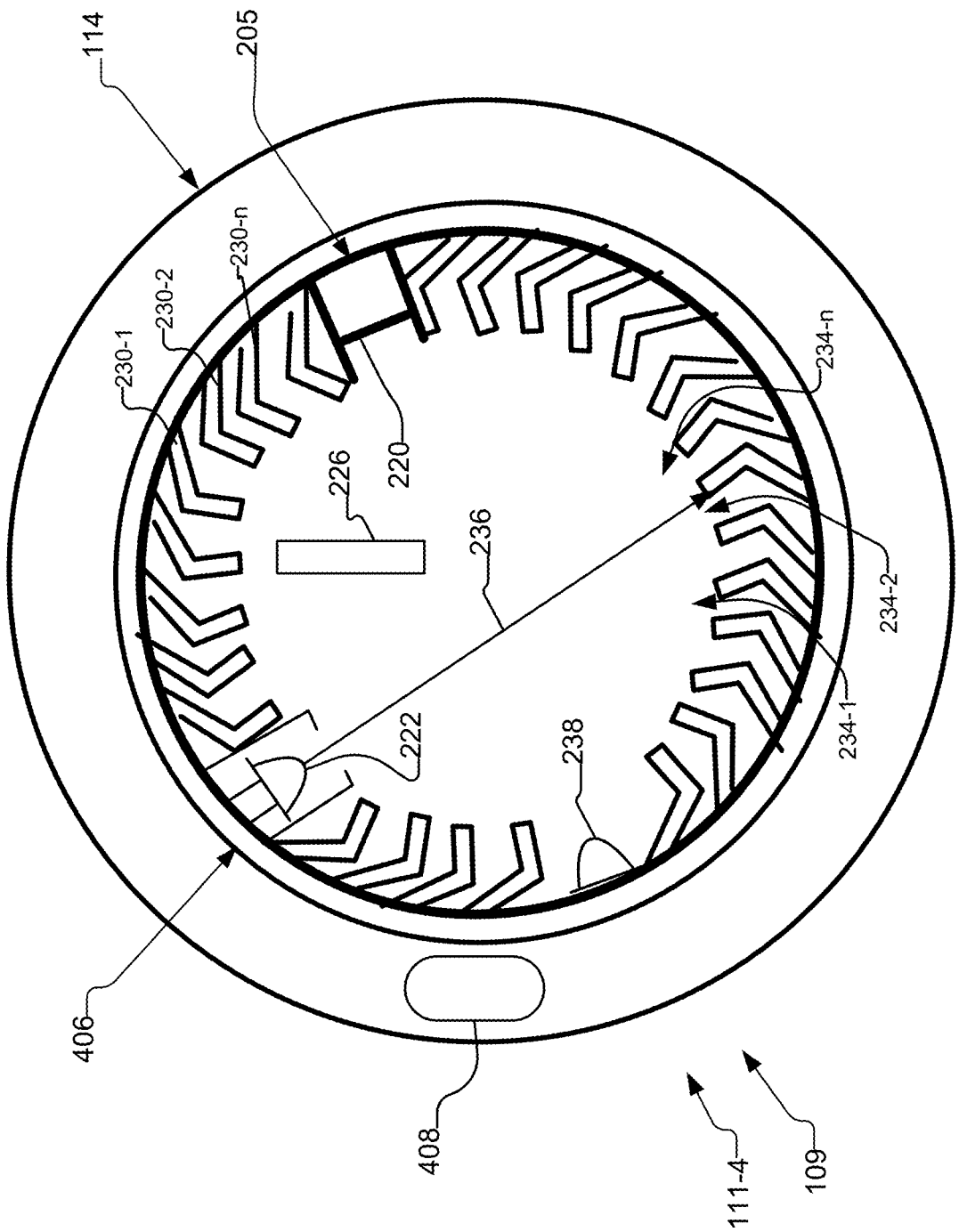
FIG. 5A is a plan view of a detection chamber of an exemplary smoke sensor device of the fire sensor devices, where the figure also illustrates operation of the smoke sensor device in response to illumination by a testing light source.

FIG. 5A illustrates exemplary operation of a detection chamber 205 within a smoke detection system 406 of an exemplary smoke sensor device 109. A light source 222 generates light 236 that is detected by a photoelectric sensor 220 as the result of a scattering medium, such as smoke, being present in the chamber 205. A testing light source 238, which is a small dimmable light source in a direct path to the light photodetector 220, is also included to test operation of the smoke detection system 406 in some examples.

The detection chamber 205 is defined by a baffle system 230, which includes individual baffles 230-1 to 230-*n*. The arrangement of the baffles 230-1 to 230-*n* form channels or pathways 234-1 to 234-*n* that allow air, smoke, and also dirt and dust to flow through to the detection chamber 205. The baffles are also commonly referred to as vanes, walls, or labyrinths, to list a few examples.

The smoke detection system 406 detects the presence of smoke as an indication of fire within the detection chamber 205. In the illustrated example, the smoke detection system comprises the scattered light photodetector 220 for detecting light 236 that has been scattered due to the smoke or other scattering medium collecting within the detection chamber 205. If smoke is present in the detection chamber 205, the light from the source 222 is reflected and scattered by the smoke and detected by the scattered light photodetector 220. A blocking baffle 226 is installed within the detection chamber 205 to prevent the light 236 from having a direct path to the scattered light photodetector 220.

Auxiliary detection system 408 is also included on or within the housing 114 of the fire alarm device (here, fire alarm sensor 111-4/smoke sensor device 109) for capturing audio and/or image information 28/38. In this way, the same device includes both a smoke detection system and the auxiliary detection system.

Figure 5C:
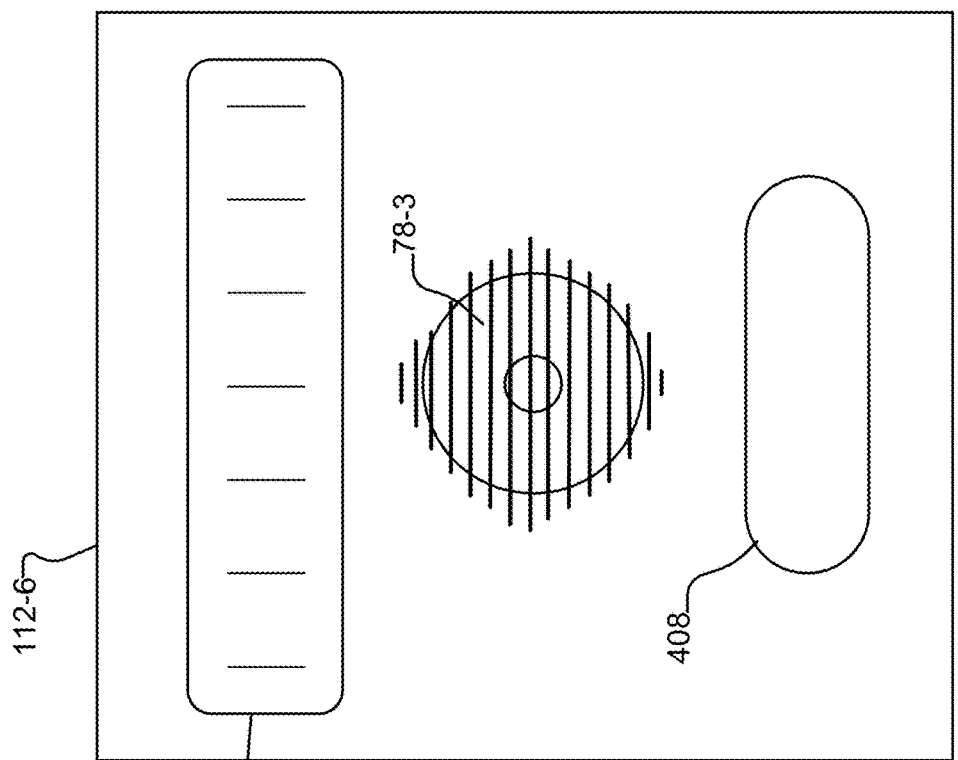
FIGS. 5B and 5C are schematic diagrams showing a front view of different alarm notification devices of the fire alarm devices.
Figure 5B:
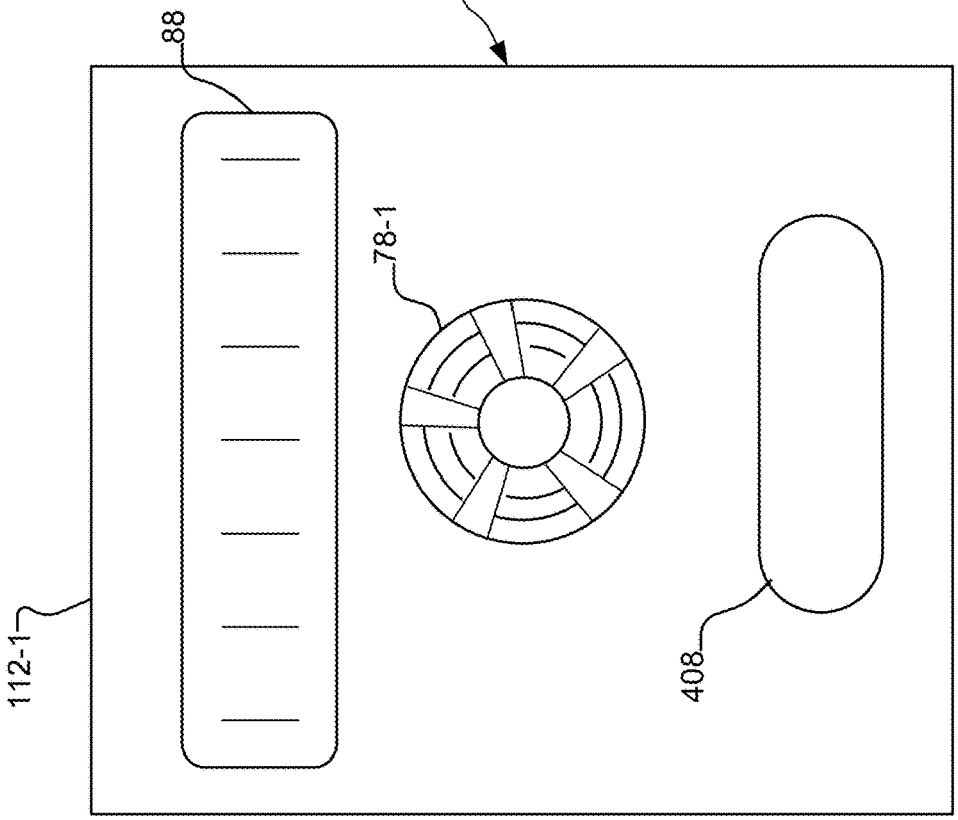

FIG. 5B shows a front panel view of an exemplary alarm notification device 112-1 that includes a visible indicator 88, audible indicator 78-1, and an auxiliary detection system 408 included on or within the housing 114 of the fire alarm device (here, alarm notification device 112-1). The visible indicator 88 is preferably a strobe light but can also include light emitting diodes (LEDs) in an alternate configuration, in another example. The audible indicator 78-1 is a buzzer, in one example but can also include multi-toned audible indicators 78-2 such as sirens. In this way, the same device includes both visible indicators 88 and/or audible indicators and the auxiliary detection system.

FIG. 5C also shows a front panel view of an exemplary alarm notification device 112-2 including a visible indicator 88, audible indicator 78-3, and an auxiliary detection system 408 included on or within the housing 114 of the fire alarm device (here, alarm notification device 112-2). The audible indicator 78-3 is a speaker, in one example.

Figure 6:
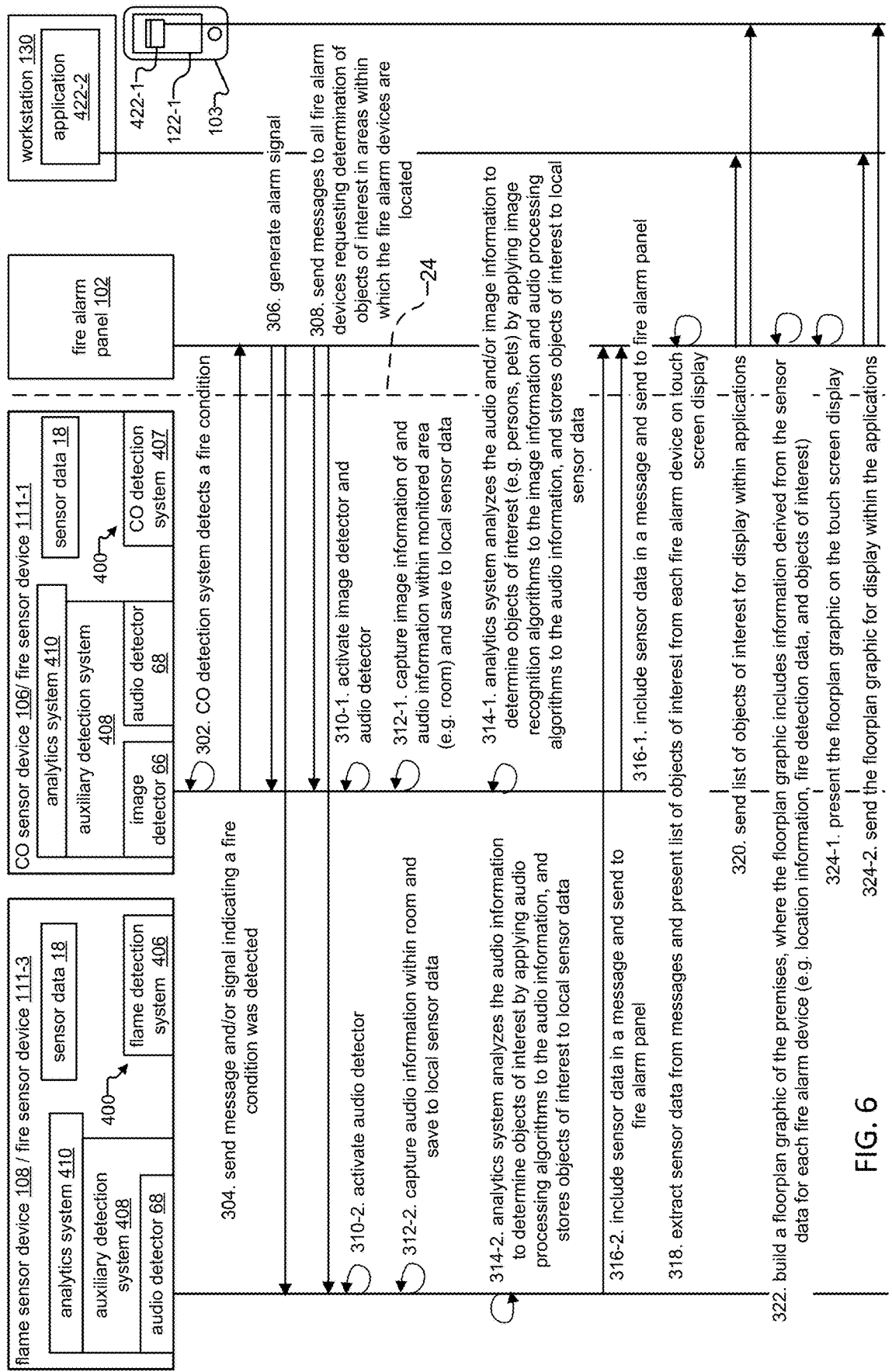
FIG. 6 is a sequence diagram illustrating a method of the first embodiment of the fire alarm system in FIG. 3A/3B, where the sequence diagram shows exemplary interactions between major components of the fire alarm system in response to a fire condition in the premises.

FIG. 6 is a sequence diagram illustrating a method of the first embodiment of the fire alarm system in FIG. 3A/3B, where the sequence diagram shows exemplary interactions between major components of the fire alarm system in response to a fire condition in the premises;

FIG. 6 describes a method of operation of the first embodiment of the fire alarm system 100-1 in FIG. 3A/3B by showing exemplary interactions between major components of the tire alarm system 100-1 in response to a fire condition. The interactions occur between the fire alarm panel 102, two exemplary fire sensor devices 111-1 and 111-3 (which are also carbon monoxide sensor device 109 and flame sensor device 108, respectively), and applications 422-1/422-2 executing on a user device 103 and workstation 130, respectively. The interactions are triggered when the carbon monoxide sensor device 109 detects carbon monoxide in room 1 113-1 as an indication of fire.

In step 302, the CO detection system 304 of carbon monoxide sensor device 106 in room 1 113-1 detects a fire condition 80. According to step 304, the carbon monoxide sensor device 106 sends a message and/or signal indicating that a fire condition was detected to the fire alarm panel 102. In response, the fire alarm panel 102. In step 306 generates an alarm signal, which is sent to all fire alarm devices via the detection/notification circuits 24/34. Then, in step 308, the fire alarm system 102 sends messages and/or signals to all fire alarm devices, the messages requesting determination of objects of interest 58 in areas 113 within which the fire alarm devices are located.

In step 310-1, carbon monoxide sensor device 106 activates its image detector 66 and audio detector 68 and/or access image and/or audio data that had been previously captured, and in step 310-2 the flame sensor device 108 activates its audio detector 66. In step 312-1, the carbon monoxide sensor device 106 captures new image information 38 of and audio information 28 within its monitored area (e.g. room 111) and saves the image information 38 and audio information 28 to local sensor data 18. In a similar fashion in step 312-2, the flame sensor device 108 captures new audio information 28 within room 111 and saves the audio information 28 to local sensor data 18.

According to step 314-1, analytics system 410 of the carbon monoxide sensor device 106 analyzes the previously captured and/or new audio and/or image information 28/38 to determine objects of interest 58 (e.g. persons 60, pets 88) by applying image recognition algorithms 54 to the image information 38 and audio processing algorithms 56 to the audio information 28, and stores any objects of interest 58 to the local sensor data 18.

In step 314-2, in a similar fashion, analytics system 410 of the flame sensor device 108 analyzes the audio information 28 to determine objects of interest 58 by applying audio processing algorithms 56 to the audio information 28, and stores any determined objects of interest 58 to the local sensor data 18.

In step 316-1, the carbon monoxide sensor device 106 includes the sensor data 18 in a message and sends the message to the fire alarm panel 102. In an alternative implementation, only the objects of interest 58 are included in the message. In a similar fashion, the flame sensor device 108 in step 316-2 includes the sensor data 18 in a message and sends the message to the fire alarm panel 102.

Then, in step 318, the fire alarm panel 102 extracts the sensor data 18 from the messages and presents a list of the objects of interest 58 from each fire alarm device on touch screen display 122-3. The fire alarm panel 102 also sends the list of objects of interest 58 for display within application 422-2 executing on workstation 130 and/or for display within application 422-1 executing on user device 103, in step 320.

According to step 322, the fire alarm panel builds a floorplan graphic 414 of the premises/building 90, where the floorplan graphic 414 includes information derived from the sensor data 18 for each fire alarm device (e.g. location information 10, fire detection data 48, and objects of interest 58, in examples).

In step 324-1, the fire alarm panel 102 presents the floorplan graphic 414 on the touch screen display 122-3 of the fire alarm panel 102. In step 324-2, the fire alarm panel 102 sends the floorplan graphic 414 for display within applications 422-1/422-2.

Figure 7:
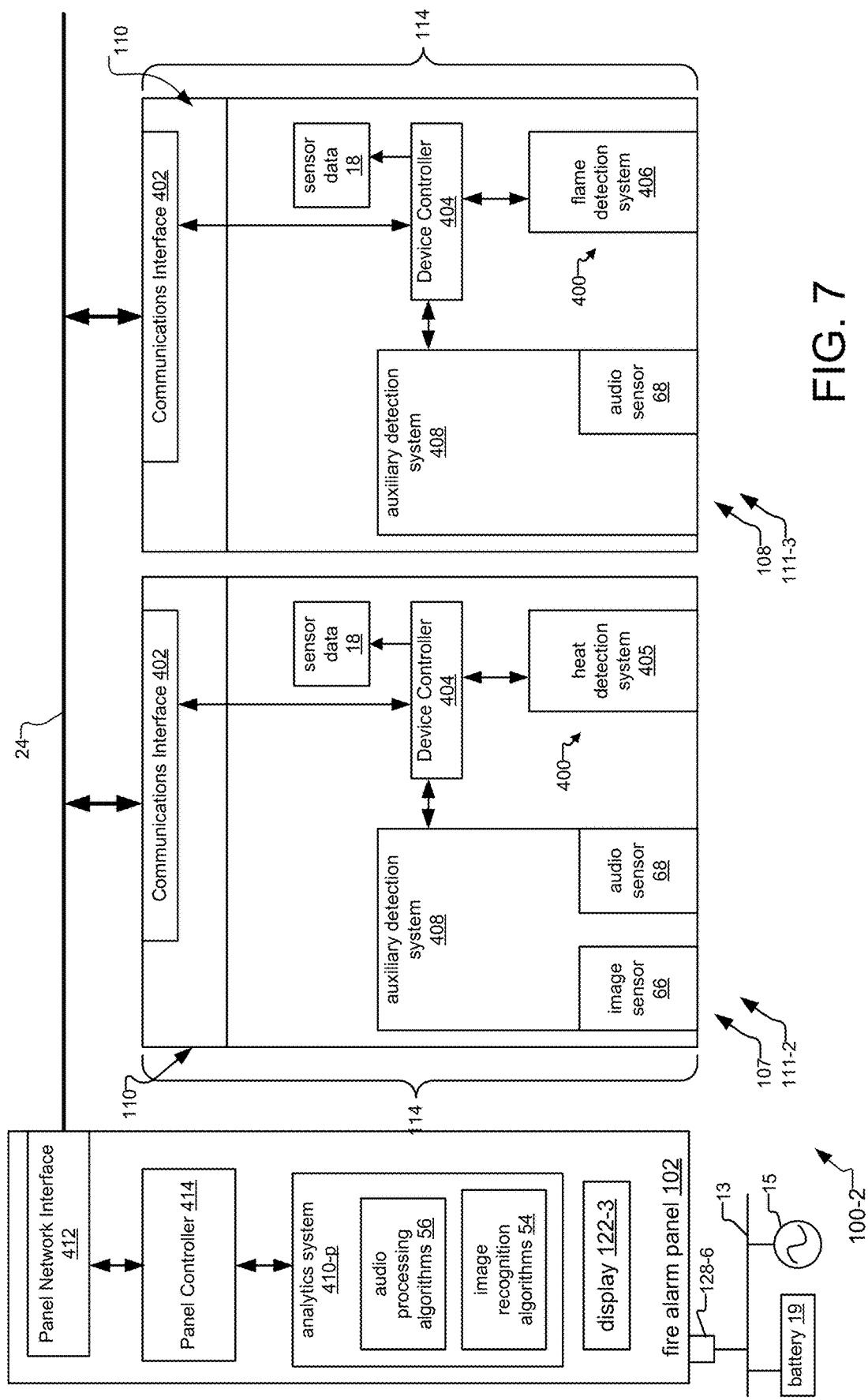
FIG. 7 is a block diagram showing more detail for a second embodiment of the fire alarm system, showing fire sensor devices of the fire alarm devices that capture audio and/or image information, and then send the audio and/or image information to an analytics system of the fire alarm panel for determining the existence of objects of interest from the audio and/or image information.

FIG. 7 shows the second embodiment of the fire alarm system 100-2. As in the first embodiment, the fire alarm devices capture audio and/or image information 28/38. In contrast, in FIG. 7, any analysis to determine objects of interest 58 from the audio and/or image information 28/38 is executed by other components of the fire alarm system 100-2.

In one example, analytics system 410-$p$ within the fire alarm panel 102 analyzes the audio and/or image information 28/38 to determine the objects of interest 58. Analytics system 410-$p$ includes audio processing algorithms 56 and image recognition algorithms 54. In another example, analytics system 410-$c$ within server 140 of remote network 23 analyzes the audio and/or image information 28/38 from the fire alarm devices to determine the objects of interest 58 associated with each of the fire alarm devices. As a result, the captured audio and/or image information 28/38, i.e., the raw or compressed sensor data, is sent over detection/notification circuits 24/34 to the panel 102, which performs the analytics.

In the illustrated examples, fire alarm system 100-2 includes heat sensor device 107 and flame sensor device 108 as a fire sensor devices 111-2/111-3. Common components among the fire sensor devices 111-2 and 111-3 include housing 114 and base 110 of the housing 110, the communications interface 402, device controller 404, and auxiliary detection system 408. Both fire sensor devices 111-2 and 111-3 provide local storage 18 of sensor data.

Fire sensor 111-2 additionally includes a heat detection system 405 as its fire detection system 400, and its auxiliary detection system 408 includes an image sensor 66 and an audio sensor 68. Fire sensor 111-2 additionally includes a flame detection system 406 as its fire detection system 400, and its auxiliary detection system 408 includes an audio sensor 68.

Figure 8:
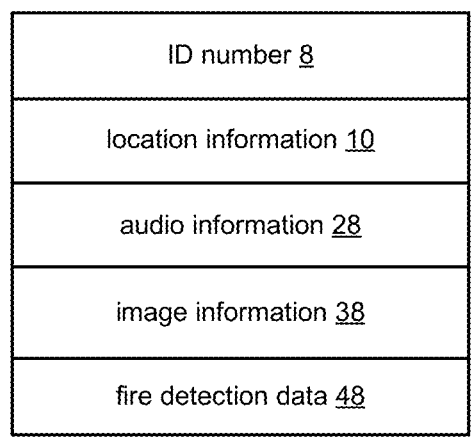
FIG. 8 is a block diagram of sensor data stored within an alarm notification device of the fire alarm devices, in accordance with the second embodiment of the fire alarm system in FIG. 7.

FIG. 8 provides detail for sensor data stored in memory 18 within a fire alarm device in accordance with the second embodiment of the fire alarm system 100-2 in FIG. 7. The sensor data 18 includes an ID number 8, location information 10, audio information 28, image information 38, and fire detection data 48.

Returning to FIG. 7, in response to fire sensor device 111-2 receiving an alarm signal generated by the fire alarm panel 102 over the communications interface 402, the device controller 404 instructs auxiliary detection system 408 to capture or continue to capture audio information 28 and image information 38. The device controller 404 stores the audio information 28 and image information 38 to sensor data memory 18. In a similar fashion, device controller 404 of fire sensor device 111-3 instructs its auxiliary detection system 408 to capture audio information 28, and its device controller 404 stores the audio information 28 to local sensor data memory store 18.

The fire sensor devices 111-2/111-3 then send messages including the raw or compressed sensor data over the detection circuit 24 to the fire alarm panel 102, where the messages include the audio and/or image information 28/38 from each of the fire sensor devices 111-2/111-3. Alternatively, the fire sensor devices 111-2/111-3 include the entirety of their sensor data 18 in the messages. In one example, the analytics system 410-*p* can then determine objects of interest 58 from the audio and/or image information 28/38. In another example, the fire alarm panel 102 can forward the audio and/or image information 28/38 from each of the fire alarm devices over the remote network 23 for analytics system 410-*c* to determine the objects of interest 58 from the audio and/or image information 28/38.

Figure 9:
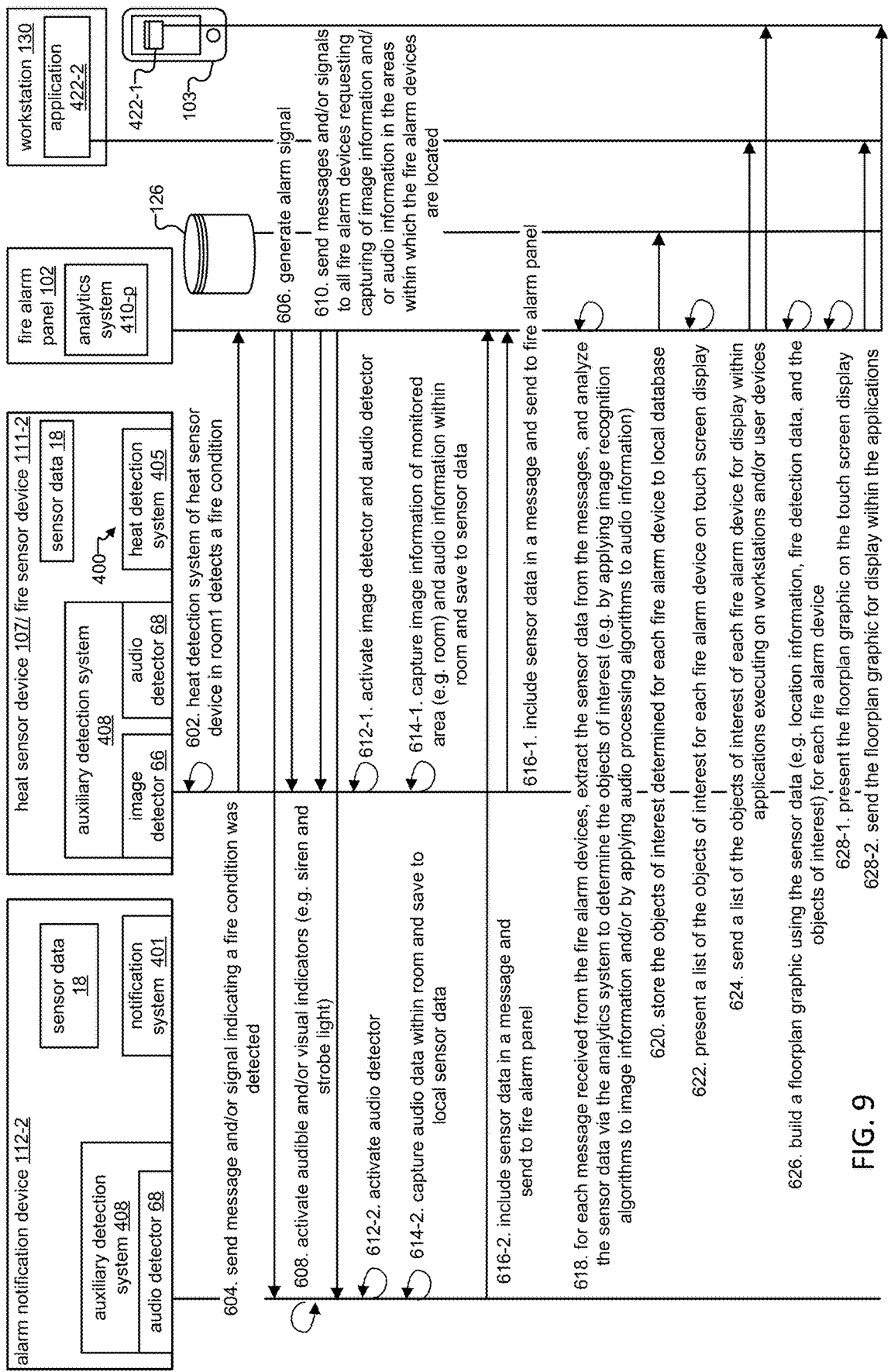
FIG. 9 is a sequence diagram illustrating a method of the second embodiment of the fire alarm system in FIG. 7, where the sequence diagram shows exemplary interactions between major components of the fire alarm system in response to a fire condition in the premises.

FIG. 9 shows exemplary interactions between major components of the second embodiment of fire alarm system 100-2 in response to a fire condition. The interactions occur between the fire alarm panel 102, an alarm notification device 112-2 of the fire alarm devices, a heat sensor device 107 of the fire sensor devices 111 of the fire alarm devices, and applications 422-1/422-2 executing on a user device 103 and a workstation 103, respectively. The interactions are triggered when the heat sensor device 107 detects heat in room 1 113-1 as an indication of fire.

In step 602, the heat detection system 405 of heat sensor device 107 in room 1 113-1 detects a fire condition 80. According to step 604, the heat sensor device 107 sends a message and/or signal indicating that a fire condition was detected to the fire alarm panel 102. In response, the fire alarm panel 102 in step 606 generates an alarm signal that is sent to all fire alarm devices via the detection/notification circuits 24/34.

In step 608, in response to receiving the alarm signal, alarm notification device 112-2 activates its audible and/or visual indicators 78/88 such as sirens and strobe lights. According to step 610, the fire alarm panel 102 sends messages and/or signals to all fire alarm devices, the messages requesting capturing of audio and/or image information 28/38 in areas 113 within which the fire alarm devices are located.

In step 612-1, heat sensor device 107 activates its image detector 66 and audio detector 68, if not already active, and alarm notification device 112-2 activates its audio detector 66 in step 612-2. In step 614-1, the heat sensor device 107 then sends image information 38 of and audio information 28 within its monitored area (e.g. room 1 113-1) and saves the image information 38 and audio information 28 to local sensor data memory 18. In some examples, this sensor data includes recently captured images of the room, such as images captured over the previous 10 minutes. In these example, the sensor data also include realtime-sensor data contemporaneously captured. In a similar fashion, the alarm notification device 112-2 captures audio information 28 within room 1 111-1 and saves the audio information 28 to local sensor data memory 18 in step 614-2.

According to step 616-1, the heat sensor device 107 includes its sensor data 18 in a message and sends the message to the fire alarm panel 102. In a similar fashion, notification device 112-1 includes its sensor data 18 in a message and sends the message to the fire alarm panel 102.

In step 618, for each message received from the fire alarm devices, the fire alarm panel 102 extracts the sensor data 18 from the messages, and analyzes the sensor data 18 via analytics system 410-*p* to determine the objects of interest 58. For this purpose, the analytics system 410-*p*, in one example, applies its image recognition algorithms 54 to the image information 38 and its audio processing algorithms 56 to the audio information 28.

Alternatively, in another implementation, the fire alarm panel 102 can send the sensor data 18 from each of the fire alarm devices over the remote network 23 for analysis by the analytics system 410-*c* within server 140. The analytics system 410-*c* can then determine the existence of any objects of interest 58, and include these in messages that the analytics system 410-*c* sends back to the fire alarm panel 102.

In step 620, the fire alarm panel 102 stores the objects of interest 58 determined for each fire alarm devices to database 126. Alternatively, in yet another implementation, the fire alarm panel 102 can send the entirety of sensor data 18 from each of the fire alarm devices for storing to the database 126. Components such as the workstation 130 can then analyze the sensor data 18 not only to determine objects of interest, but also to execute statistical analysis upon the sensor data 18.

In step 622, the fire alarm panel 102 presents a list of the objects of interest 58 for each of the fire alarm devices on the touch screen display 122-3. In step 624, the fire alarm panel 102 sends the objects of interest 58 for each of the fire alarm devices for display within applications 422-1/422-2 executing on user devices 103 and workstation 130, respectively.

According to step 626, the alarm panel 102 builds a floorplan graphic 414 of the premises/building 90 using the sensor data 18 (e.g. location information 10, fire detection data 48, and objects of interest 58) for each fire alarm device. In step 628-1, the fire alarm panel 102 presents the floorplan graphic 414 on the touch screen display 122-3 of the fire alarm panel 102. In step 628-2, the fire alarm panel 102 sends the floorplan graphic 414 for display within applications 422-1/422-2.

Figure 10:
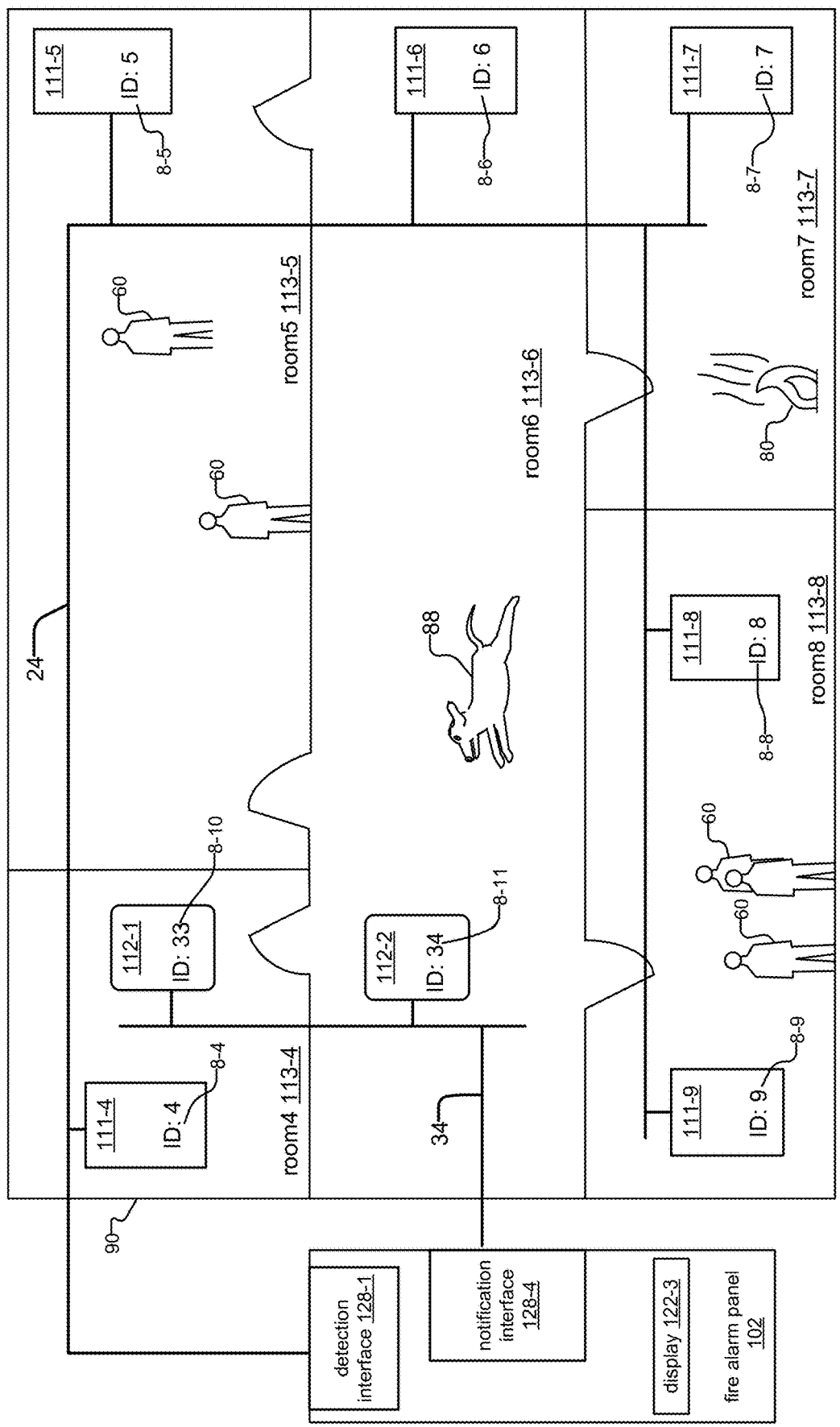
FIG. 10 shows an exemplary floorplan of a premises that includes locations of fire alarm devices and the fire alarm panel relative to rooms of the premises.

FIG. 10 shows an exemplary floorplan of a premises 90. The floorplan includes locations of fire alarm devices. The fire alarm panel 102 generates a floorplan graphic 414 from the floorplan for "at a glance" visual indication of fire conditions and/or objects of interest 58 within each room 133 or monitored area within the premises 90 for operators and first responders.

Fire alarm sensors 111-4 through 111-9 on detection circuit 24 are shown, each having a unique ID number 8-4 through 8-9, respectfully. Alarm notification devices 112-1 and 112-2 are also shown, having unique ID numbers 8-10 and 8-11, respectfully.

Fire alarm sensor 111-4 and alarm notification device 112-1 are located in room 4 113-4. Fire alarm sensor 114-5 is located in room 5 113-5. Two persons are also included within room 5 113-5. Room 6 113-6, a long corridor, includes dog 88 and alarm notification device 112-2 and fire alarm sensor 111-6. Room 7 113-7 includes fire alarm sensor 111-7, which detects fire condition 80 within room 7 113-7. Finally, room 8 113-8 includes fire alarm sensors 111-8 and 111-9, and three persons 60 are also located within room 8 113-8.

In response to fire alarm sensor 111-7 detecting the fire condition 80 and in accordance with the method for fire alarm system 100-1 described in FIG. 6 and with the method for fire alarm system 100-2 described in FIG. 9, the fire alarm panel 102 generates a floorplan graphic 414 from the floorplan. The floorplan graphic 414 is shown in FIG. 11.

Figure 11:
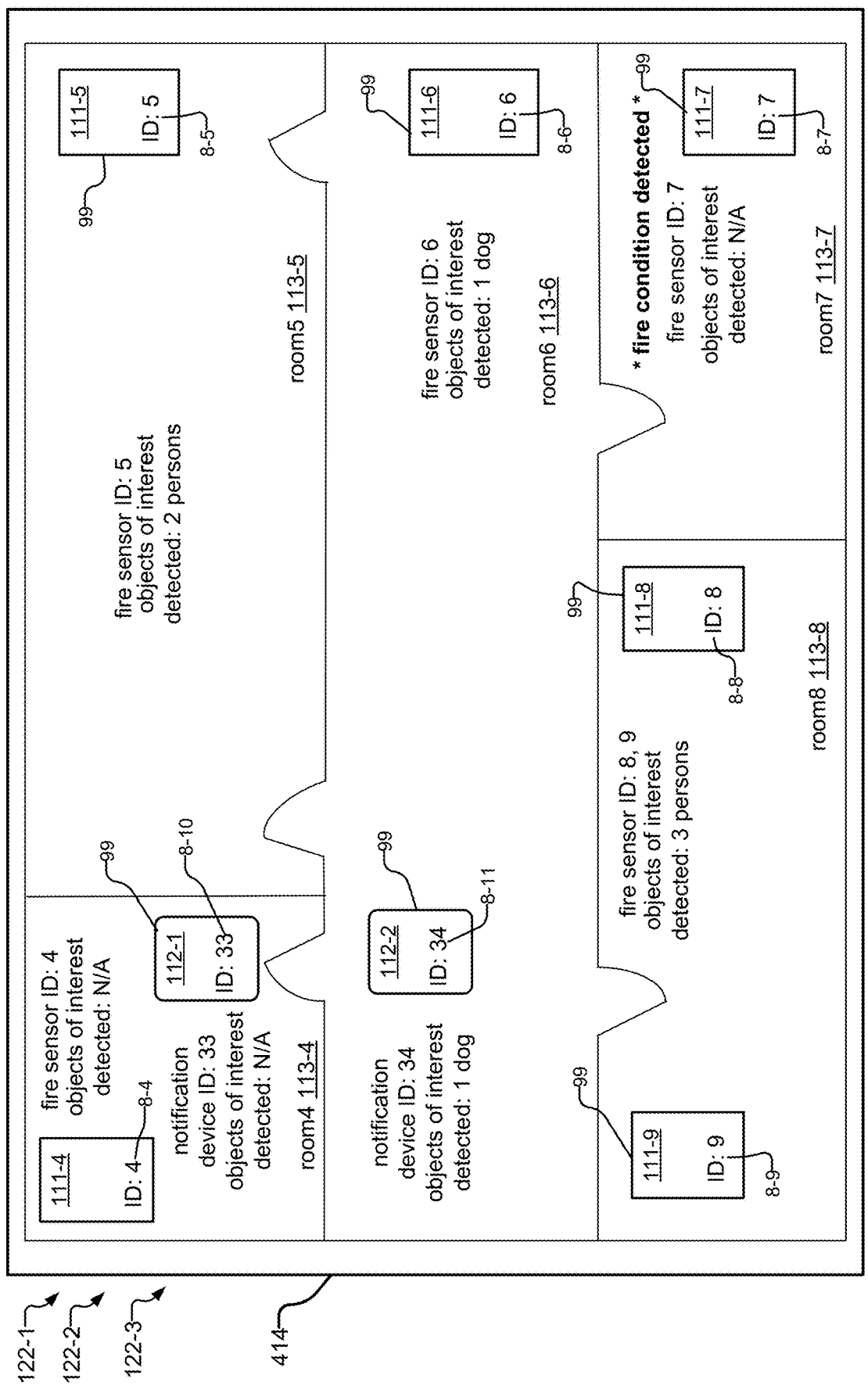
FIG. 11 shows a floorplan graphic that the fire alarm panel generates from the floorplan of FIG. 10, where the floorplan graphic enables "at a glance" visual indication of fire conditions and/or objects of interest determined within the premises for operators and first responders, and where the floorplan graphic can be displayed on a touch screen display of the fire alarm panel, presented on a display screen of a user device and/or presented on a display screen of a workstation, in examples.

FIG. 11 shows a floorplan graphic 414 generated by the fire alarm panel 102 from the floorplan in FIG. 10. The floorplan graphic 414 is shown as it may appear when presented on display screen 122-1 via application 422-1 of user device 103, when presented on display screen 122-2 via application 422-2 of workstation 130, and as displayed within touch screen display 122-3 of the fire alarm panel 102.

The floorplan graphic includes icons 99 for each of the fire alarm devices. The icons 99 are displayed within the rooms 113 of the graphic 414 in accordance with the locations within the rooms in which the fire alarm devices are installed. Within the icons, the ID number 8 for each of the fire alarm devices is displayed.

Information derived from the sensor data 18 of each of the fire alarm devices, such as objects of interest 58, is also displayed within/overlaid upon the rooms 113 within which the fire alarm devices are installed. Room 4 113-4 includes icons 99 for fire alarm sensor 111-4 and alarm notification device 112-1. Because no objects of interest 58 were determined to exist within room 4 113-4 by the fire alarm system 100, this information is reflected within room 4 133-4 of the graphic 414 for presentation to the operator/first responder 70.

Room 5 113-5 includes one icon 99 for fire alarm sensor 111-5. Because two persons 60 were determined to be an objects of interest 58 within room 5 113-5 by the fire alarm system 100, information to this effect is reflected within room 5 113-5 of the graphic 414 for presentation to the operator/first responder 70.

Room 6 113-6, a hallway or corridor, includes one icon 99 for fire alarm sensor 111-6 and another icon 99 for alarm notification device 112-2. Because a dog 60 was determined to be an objects of interest 58 within room 6 113-6 by the fire alarm system 100, this information is reflected within room 6 113-6 of the graphic 414 for presentation to the operator/first responder 70.

Room 7 113-7 includes one icon 99 for fire alarm sensor 111-7. Because fire alarm sensor 111-7 detected a fire condition 80 within the area monitored by the fire alarm sensor 111-7 but no objects of interest 58 were determined, information to this effect is reflected within room 7 113-7 of the graphic 414 for presentation to the operator/first responder 70.

Finally, room 8 113-8 includes one icon 99 for fire alarm sensor 111-8 and another icon 99 for fire alarm sensor 111-9. Because three persons 60 were determined to be objects of interest 58 within room 8 113-8 by the fire alarm system 100, information to this effect is reflected within room 8 113-8 of the graphic 414 for presentation to the operator/first responder 70.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire alarm system, comprising:
   fire alarm devices deployed within a premises that capture audio and/or image information via audio and/or video detection systems located within housings of the fire alarm devices, and determine a number of people within individual rooms of the premises based on performing image recognition on the image information and/or audio processing on the audio; and
   a fire alarm panel that includes a touchscreen display and that generates alarm signals and provides notifications of an existence of the people from the audio and/or image information captured by the fire alarm devices;
   wherein the fire alarm panel generates a floorplan graphic of the premises on the touchscreen display, wherein the floorplan graphic includes location information of the fire alarm devices, the number of people within the individual rooms of the premises, and location information identifying a location of the people within the individual rooms.

2. The system of claim 1, wherein the fire alarm devices include alarm notification devices that generate an audible and/or visible fire alarm to occupants of the premises, wherein the alarm notification devices are included within the housings along with the audio and/or video detection systems.

3. The system of claim 1, wherein the fire alarm devices include fire sensor devices that monitor for indications of fire, wherein the fire sensor devices are included within the housings along with the audio and/or video detection systems.

4. The system of claim 1, wherein the fire alarm devices include smoke sensor devices that monitor for smoke as an indication of fire, wherein the smoke sensor devices are included within the housings along with the audio and/or video detection systems.

5. The system of claim 1, wherein the fire alarm devices include heat sensor devices that monitor for heat as an indication of fire.

6. The system of claim 1, wherein the fire alarm devices include carbon monoxide sensor devices that monitor for carbon monoxide as an indication of fire.

7. The system of claim 1, wherein the fire alarm devices include an analytics system that determines an existence of objects of interest from the audio and/or image information.

8. The system of claim 1, wherein the fire alarm panel includes an analytics system that determines an existence of objects of interest from the audio and/or image information captured by the fire alarm devices and transmitted to the fire alarm panel.

9. The system of claim 1, wherein the fire alarm panel includes a display that provides the floorplan graphic of the premises that includes the location information of the fire alarm devices and/or the people within the individual rooms of the premises.

10. The system of claim 1, wherein the fire alarm system additionally determines locations of objects of interest relative to areas in the premises within which the fire alarm devices are deployed, from the audio and/or image information captured by the fire alarm devices.

11. An alarm notification device, comprising:
a housing;
one or more notification systems located on or within the housing that generate an audible and/or visible fire alarm for occupants of a premises;
one or more auxiliary detection systems located on or within the housing for capturing audio and/or image information and determining a number of people within individual rooms of the premises based on performing image recognition on the image information and/or audio processing on the audio; and
a communications interface located on or within the housing for communicating with a fire alarm panel, wherein the communications interface provides notifications of existence of the people within individual rooms of the premises from the audio and/or image information captured by the one or more auxiliary detection systems.

12. A fire sensor device, comprising:
a housing;
one or more fire detection systems located on or within the housing for detecting indications of fire;
one or more auxiliary detection systems located on or within the housing for capturing audio and/or image information, and determining a number of people within individual rooms of a premises based on performing image recognition on the image information and/or audio processing on the audio; and
a communications interface located on or within the housing for communicating with a fire alarm panel, wherein the communications interface provides notifications of existence of the people within individual rooms of the premises from the audio and/or image information captured by the one or more auxiliary detection systems.

13. A method for a fire alarm system, comprising:
capturing audio and/or image information via fire alarm devices deployed within a premises;
determining, via the fire alarm devices, a number of people within individual areas of the premises based on performing image recognition on the image information and/or audio processing on the audio; and
providing notifications of existence of the people within individual areas of the premises, the providing including a fire alarm panel of the fire alarm system presenting location information of the fire alarm devices and the number of the people within individual areas of the premises on a display.

14. The method of claim 13, further comprising alarm notification devices of the fire alarm devices capturing the audio and/or image information.

15. The method of claim 13, further comprising alarm notification devices of the fire alarm devices generating an audible and/or visible fire alarm to occupants of the premises.

16. The method of claim 13, further comprising fire sensors of the fire alarm devices monitoring for indications of fire.

17. The method of claim 13, further comprising the fire alarm devices including smoke sensors that monitor for smoke as an indication of fire.

18. The method of claim 13, further comprising the fire alarm devices including heat sensors that monitor for heat as an indication of fire.

19. The method of claim 13, wherein in response to one or more of the fire alarm devices detecting an indication of fire:
the one or more of the fire alarm devices sending the indication of fire to a fire alarm panel of the fire alarm system; and
the fire alarm panel sending messages to the fire alarm devices requesting the capturing of the audio and/or image information.

20. The method of claim 13, wherein providing notifications of existence of the people within individual rooms of the premises comprises the fire alarm devices sending a list of the people to a user device.

21. The method of claim 13, wherein the display is part of the fire alarm panel.

22. The method of claim 13, wherein providing notifications of existence of the people within individual rooms of the premises comprises:
generating a floorplan graphic of the premises that includes location information of the fire alarm devices and the people within individual rooms of the premises; and
sending the floorplan graphic for presentation within a display screen of a user device.

23. The method of claim 13, wherein providing notifications of the existence of the people comprises a fire alarm panel of the fire alarm system generating a floorplan graphic of the premises that includes location information of the fire alarm devices and the people within individual rooms of the premises, the number of people within individual areas of the premises, and presenting the floorplan graphic on a display of the fire alarm panel.

24. The method of claim 13, wherein providing notifications of the existence of the people comprises:
generating a floorplan graphic of the premises that includes location information of the fire alarm devices and the people within individual rooms of the premises; and
sending the floorplan graphic for presentation within a display screen of a user device, wherein the floorplan graphic includes icons for each of the fire alarm devices and the people within individual rooms of the premises, the icons being displayed within rooms of the graphic in accordance with locations within the rooms in which the fire alarm devices are installed.

25. The system of claim 1, wherein the fire alarm devices include a ring buffer for storing the audio and/or image information.

26. The alarm notification device of claim 11, further comprising a ring buffer for storing the audio and/or image information.

27. The fire sensor device of claim 12, further comprising a ring buffer for storing the audio and/or image information.

28. The method of claim 13, wherein capturing audio and/or image information via the fire alarm devices deployed within the premises comprises storing the audio and/or image information on a ring buffer of the fire alarm devices.

* * * * *